United States Patent
Weber et al.

(10) Patent No.: US 8,418,086 B2
(45) Date of Patent: Apr. 9, 2013

(54) ISOLATING RECEIVED INFORMATION ON A LOCKED DEVICE

(75) Inventors: Karon A. Weber, Kirkland, WA (US); Katrika Woodcock, Issaquah, WA (US); Jennifer Lauren Rodenhouse, Seattle, WA (US); Alistair Hamilton, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 297 days.

(21) Appl. No.: 12/474,281

(22) Filed: May 29, 2009

(65) Prior Publication Data

US 2010/0146235 A1    Jun. 10, 2010

Related U.S. Application Data

(60) Provisional application No. 61/119,806, filed on Dec. 4, 2008.

(51) Int. Cl.
- *G06F 3/14* (2006.01)
- *G06F 12/00* (2006.01)
- *G06F 13/00* (2006.01)
- *G06F 13/28* (2006.01)

(52) U.S. Cl. .................................. 715/864; 711/165

(58) Field of Classification Search .................. 715/864; 711/165
See application file for complete search history.

(56) References Cited

U.S. PATENT DOCUMENTS

| | | | |
|---|---|---|---|
| 6,243,724 B1 | 6/2001 | Mander et al. | |
| 6,466,969 B1 | 10/2002 | Bunney et al. | |
| 6,574,484 B1 | 6/2003 | Carley | |
| 7,120,865 B1 | 10/2006 | Horvitz et al. | |
| 7,231,231 B2 | 6/2007 | Kokko et al. | |
| 7,453,443 B2 | 11/2008 | Rytivaara et al. | |
| 7,516,884 B2 * | 4/2009 | Chase-Salerno et al. | 235/380 |
| 7,660,864 B2 | 2/2010 | Markki et al. | |
| 7,881,283 B2 | 2/2011 | Cormier et al. | |
| 2004/0085351 A1 | 5/2004 | Tokkonen | |

(Continued)

FOREIGN PATENT DOCUMENTS

| | | |
|---|---|---|
| EP | 1569064 A1 | 8/2005 |
| EP | 1953663 A1 | 8/2008 |

(Continued)

OTHER PUBLICATIONS

"Capture—Definition and More from the Free Merriam-Webster Dictionary", retrieved from http://www.merriam-webster.com/dictionary/capture.*

(Continued)

*Primary Examiner* — Kieu Vu
*Assistant Examiner* — Aaron Lowenberger

(57) ABSTRACT

Quarantining data received while a computing device is locked. While the computing device is locked, content items such as images, notifications, voice memos, telephone numbers, and the like are stored in a first memory area. The content items are transferred to a second memory area, separate from the first memory area, based on transfer criteria associated with the content items. For example, images may be automatically uploaded to a web page after the computing device is unlocked, while a mail program executes to display any messages received while the display has been locked. In some embodiments, the user inputs the content items into a locked mobile computing device and further provides the transfer criteria for the content items.

15 Claims, 4 Drawing Sheets

U.S. PATENT DOCUMENTS

| | | | |
|---|---|---|---|
| 2004/0243682 | A1 | 12/2004 | Markki et al. |
| 2005/0240880 | A1 | 10/2005 | Banks et al. |
| 2006/0003742 | A1 | 1/2006 | Seligmann et al. |
| 2006/0017692 | A1 | 1/2006 | Wehrenberg et al. |
| 2006/0161749 | A1 | 7/2006 | Chen et al. |
| 2007/0014280 | A1 | 1/2007 | Cormier et al. |
| 2007/0028176 | A1 | 2/2007 | Perdomo et al. |
| 2007/0107014 | A1 | 5/2007 | Howard et al. |
| 2007/0145680 | A1 | 6/2007 | Rosenberg |
| 2007/0150842 | A1 | 6/2007 | Chaudhri et al. |
| 2007/0207782 | A1 | 9/2007 | Tran |
| 2007/0260866 | A1 | 11/2007 | Wang et al. |
| 2007/0279419 | A1 | 12/2007 | Seebach |
| 2007/0280458 | A1 | 12/2007 | Aberethy et al. |
| 2007/0288582 | A1 | 12/2007 | Major et al. |
| 2008/0020803 | A1 | 1/2008 | Rios et al. |
| 2008/0086387 | A1* | 4/2008 | O'Rourke et al. ............. 705/27 |
| 2008/0094356 | A1 | 4/2008 | Ording et al. |
| 2008/0104595 | A1 | 5/2008 | Kawachiya et al. |
| 2008/0200142 | A1 | 8/2008 | Abdel-Kader et al. |
| 2008/0220752 | A1* | 9/2008 | Forstall et al. ................ 455/415 |
| 2009/0137284 | A1 | 5/2009 | Liyanaarachchi |
| 2009/0282130 | A1* | 11/2009 | Antoniou et al. ............ 709/220 |
| 2009/0282485 | A1* | 11/2009 | Bennett .......................... 726/24 |
| 2009/0284482 | A1 | 11/2009 | Chin |
| 2009/0288032 | A1 | 11/2009 | Chang et al. |
| 2010/0017759 | A1 | 1/2010 | Birnbaum et al. |
| 2010/0060586 | A1* | 3/2010 | Pisula et al. .................. 345/169 |
| 2010/0079380 | A1* | 4/2010 | Nurmi ........................... 345/172 |
| 2010/0081414 | A1* | 4/2010 | Poisner ......................... 455/411 |
| 2010/0123724 | A1* | 5/2010 | Moore et al. .................. 345/473 |
| 2010/0146235 | A1 | 6/2010 | Weber et al. |
| 2010/0146384 | A1 | 6/2010 | Peev et al. |
| 2010/0146437 | A1 | 6/2010 | Woodcock et al. |
| 2010/0159995 | A1 | 6/2010 | Stallings et al. |
| 2011/0004845 | A1 | 1/2011 | Ciabarra |

FOREIGN PATENT DOCUMENTS

| | | | |
|---|---|---|---|
| KR | 20060016426 | A | 2/2006 |
| KR | 100673163 | B1 | 1/2007 |
| KR | 100722278 | B1 | 5/2007 |

OTHER PUBLICATIONS

"Spb Mobile Shell 2.1 User Manual", Retrieved at <<http://www.spbsoftwarehouse.com/products/mobileshell/Spb%20Mobile%20Shell%20User%20Manual.pdf>>, 2008, pp. 1-21.

Martellaro, John, "Security Flaw Allows Access to Screen Locked iPhone", Retrieved at <<http://www.ipodobserver.com/story/37028>>, Aug. 27, 2008, pp. 3.

"Warden Security for Windows Mobile Smartphone", Retrieved at <<http://store.handmark.com/p/2086/Warden-Security-for-Windows-Mobile-Smartphone/->>, Oct. 21, 2008, pp. 6.

Sacco, Al, "Six Essential Apple iPhone Security Tips", Retrieved at <<http://www.techworld.com.au/article/263077/six_essential_apple_iphone_security_tips?fp=4&fpid=303>>, Aug. 10, 2008, pp. 2.

"Program Lock Pro v2.12e", Retrieved at <<http://www.fileheap.com/software-program-lock-pro-download-26198.html>>, Apr. 8, 2007, pp. 3.

"What is the Gobbler?—Yahoo! for Teachers," Retrieved at <http://help.yahoo.com/l/us/yahoo/teachers/teachers-237717.html#>, Apr. 2009, pp. 1.

"International Search Report", Mailed Date: Jun. 16, 2010, Application No. PCT/US2009/064869, Filed Date: Nov. 17, 2009, pp. 11.

"Gumballtech", Retrieved at <<http://www.gumballtech.com/2009/11/21/iphone-lockscreen-battle-lockinfo-vs-cydgetsv>>, Retrieved Date: Nov. 17, 2011, pp. 12.

"Non-final Office Action in U.S. Appl. No. 12/421,646", Dated: Jan. 5, 2012, pp. 23.

"Final Office Action in U.S. Appl. No. 12/421,646", Dated: Jul. 21, 2011, pp. 24.

"Non-final Office Action in U.S. Appl. No. 12/421,646", Dated: Mar. 21, 2011, pp. 18.

"Advisory Action in U.S. Appl. No. 12/421,646", Dated: Sep. 13, 2011, pp. 3.

"Definition of Capture", Retrieved at <<http://www.merriam-webster.com/dictionary/capture>>, Retrieved Date: Jan. 5, 2012, pp. 3.

"IntelliScreen 2.2 for iPhone 2.1/3G Firmware Released!", Retrieved at <<http://web.archive.org/web/20080927061220/http://www.intelliborn.com/>>, Retrieved Dec. 23, 2011, pp. 3.

"S2U2 (Slide 2 Unlock 2)", Retrieved at <<http://replay.waybackmachine.org/20081019021449/http://s2u2.eqvipage.dk/S2U2-index.html>>, Oct. 2008, pp. 3.

"International Search Report", Mailed Date: Jul. 15, 2010, Application No. PCT/US2009/066601, Filed Date: Dec. 3, 2009, pp. 8.

"Sunscape—Slide to Lock/Unlock Utility", Retrieved at <<http://www.1800pocketpc.com/2008/09/01/sunscape-slide-to-lock-unlock-utility.html>>, Sep. 1, 2008, pp. 8.

"Organic Lock 0.8.1.5", Retrieved at <<http://www.1800pocketpc.com/2008/05/30/organic-lock-0815-an-almost-android-like-unlock-utility-for-pocketpc.htm>>, May 30, 2008, pp. 7.

George, Saijo., "ThrottleLock 0.3", Retrieved at <<http://www.1800pocketpc.com/2008/08/31/throttlelock-03-pattern-based-lock-like-on-android.html>>, Aug. 31, 2008, pp. 7.

George, Saijo., "Slide To Unlock 2 [S2U2] 1.50d—iphone like Slide to Lock Unlock for Windows Mobile", Retrieved at <<http://www.1800pocketpc.com/2009/02/26/slide-to-unlock-2-s2u2-150d-iphone-like-slide-to-lock-u nlock-for-windows-mobile.html>>, Feb. 26, 2009, pp. 8.

Multicellphone, "TalkLock by CeliAvant—Free TouchScreen Lock App for BlackBerry Storm", Retrieved at<<http://www.multicellphone.com/talklock-by-cellavant-free-touchscreen-lock-app-for-blackberry-storm/>>, Jan. 5, 2009, pp. 5.

"PocketShield v1.1.3: PPC Software", Retrieved at <<http://ppcmobiles.blogspot.com/2008/11/pocketshield-v113-ppc-software.html>>, Mar. 2, 2009, pp. 6.

Deleon, Nicholas, "Slide 2 Unlock: Slide to Unlock Any Pocket PC", Retrieved at <<http://www.crunchgear.com/2007/06/08/slide-2-unlock-slide-to-unlock-any-pocket-pc/>>, Jun. 8, 2007, pp. 8.

Thomas., "Review: Intelliscreen 1.05 iSource", Retrieved at <<http://isource.com/2008/06/22/review-intelliscreen-105/>>, Jun. 22, 2008, pp. 10.

Thomas., "Intelliscreen 2.1—Hellow Quickview Source", Retrieved at <<http://isource.com/2008/09/01/intelliscreen-21-hellow-quickview/>> Retrieved Date : Sep. 1, 2008. pp. 4.

"S2 Applications for Windows Mobile", Retrieved at <<http://67.43.3.117/~acs2co/S2U2-readme.html>>, Aug. 6, 2010, pp. 3.

"Desktop Lock 7.2.1", Retrieved at <<http://replay.waybackmachine.org/20081 0121 04906/http://www.toplang.com/desktoplock.htm>>, TopLang Software Pertinent page: wayback machine Main Desktop Lock page, Oct. 12, 2008, pp. 2.

Miller, Matthew., "Apple Files Notification Screen Patent, Is this Really that Unique?", retrieved at <<http://blogs.zdnet.com/cellphones/?=122>>, Sep. 19, 2008, p. 1.

Chewar, et al., "Unpacking Critical Parameters for Interface Design: Evaluating Notification Systems with the IRC Framework", retrieved at <<http://citeseersx.ist.psu.edu/vieweoc/download?doi=10.1.1.74.5721&rep=rep1&type=pdf>>, Aug. 1-4, 2004, Cambridge, Massachusetts, USA, pp. 10.

Matthews, et al., "Designing Glanceable Peripheral Displays", Retrieved at <<http://www.eecs.berkeley.edu/pubs/TechRpts/2006/EECS-2006-113.pdf>>, Sep. 7, 2006, pp. 11.

Dantzich, et al., "Scope: Providing Awareness of Multiple Notifications at a Glance", Retrieved at <<http://citeseerx.ist.psu.edu/viewdoc/download?doi=1 0.1.1.4.5200&rep=rep1 &type=pd>>, 2002, pp. 11.

Miller, et al., "The InfoCanvas: Information Conveyance through Personalized, Expressive Art", Retrieved at <<http:// www.cc.gatech.edu/-john.stasko/papers/chi01.pdf>>, Apr. 2001 , pp. 2.

Cadiz, et al., "Sideshow: Providing Peripheral Awareness of Important Information", Retrieved at <<http://research.microsoft.com/research/coeUSideshowITRs/01-83.pdf>>, Sep. 14, 2001, pp. 9.

Zhang, et al., "Info-Lotus: A Peripheral Visualization for Email Notification", retrieved at <<http://research.microsoft.com/acid/infolotus.pdf>>, Apr. 2-7, 2005, Portland, Oregon, USA, pp. 4.

"Non-final Office Action in U.S. Appl. No. 12/430,901", Dated: Jan. 30, 2012, pp. 33.

"Non-final Office Action in U.S. Appl. No. 12/430,901", Dated: Jun. 28, 2011, pp. 24.

"Advisory Action in U.S. Appl. No. 12/430,901", Dated: Dec. 9, 2011, pp. 4.

"Final Office Action in U.S. Appl. No. 12/430,901", Dated: Sep. 19, 2011, pp. 28.

"Intelliborn—Intelliscreen FAQs." Retrieved at <<http://web.archive.org/web/20080517141928/http://www.intelliborn.com/IntelliScreenFAQs.html>>, Sep. 5, 2011, pp. 1-2.

"Intelliborn", Retrieved at <<http://web.archive.org/web/20080516231423/http://www.intelliborn.com>>, Sep. 6, 2011, pp. 2.

"Pop-Up Email Notifications", Retrieved at <<http://modmyi.com/forums/3rd-party-apps-requests/414421-pop-up-email-notifications.html>>, Sep. 6, 2011, pp. 4.

"First Office Action in China Patent Application No. 200980149001.X", Dated: Mar. 31, 2012, pp. 6.

"Second Office Action in China Patent Application No. 200980149001.X", Dated: Sep. 6, 2012, pp. 6.

"Third Office Action in China Patent Application No. 200980149001.X", Dated: Oct. 18, 2012, pp. 6.

"Final Rejection in U.S. Appl. No. 12/421,646", Dated: May 25, 2012, pp. 25.

"Advisory Action in U.S. Appl. No. 12/421,646", Dated: Aug. 15, 2012, pp. 3.

"Applicant Initiated Interview Summary in U.S. Appl. No. 12/421,646", Dated: Apr. 16, 2012, pp. 3.

"First Office Action in China Patent Application No. 200980149061.1", Dated: Apr. 16, 2012, pp. 8.

"Second Office Action in China Patent Application No. 200980149061.1", Dated: Sep. 11, 2012, pp. 7.

"Advisory Action in U.S. Appl. No. 12/430,901", Dated: Oct. 5, 2012, pp. 3.

"Final Rejection in U.S. Appl. No. 12/430,901", Dated: Aug. 6, 2012, pp. 32.

* cited by examiner

ISOLATING RECEIVED INFORMATION ON A LOCKED DEVICE

CROSS-REFERENCE TO RELATED APPLICATION

This application claims the benefit of pending U.S. Provisional Application No. 61/119,806, filed Dec. 4, 2008, the entirety of which is hereby incorporated by reference herein.

BACKGROUND

Touch screens provide a mechanism for rapidly entering data on devices with constrained form factors. The touch screens are generally designed to operate and respond to a finger touch, a stylus tap or movement on the touch screen surface. Touching or tapping a specific point on the touch screen display will activate a virtual button, feature or function found or shown at that location on the touch screen display.

With the advent of touch screen displays on mobile telephones, for example, entering data into the mobile telephones has become easier. As such, with existing systems, users take pictures, store voice memos, read electronic mail messages and text messages, and maintain address books with the mobile telephones. To protect this information, many mobile telephones enable the display to be locked on command or after a defined timeout. To enter data with the existing systems, the user first unlocks the mobile telephone and then enters the data. However, unlocking the mobile telephone for every data input is tedious, inconvenient and slow. For example, if a user wants to capture a photograph with their locked device, the user first unlocks the device to access the photo capture application. By the time the user has unlocked the device, in many cases the action or the moment intended for capture has passed. Capturing the moment is now not possible because the user was forced to trade responsiveness for security. In setting up the device to prevent unauthorized access, the user has hampered the performance of a core feature of the device from supporting the needs of the user.

SUMMARY

Embodiments of the invention quarantine content items or other data received while a computing device is locked. Transfer criteria associated with the content items is defined. The content items and associated transfer criteria are stored in a first memory area of the computing device. Upon receiving a command to unlock the display, the display is unlocked and one or more of the content items are transferred to a second memory area based on the transfer criteria. The first memory area is quarantined from the second memory area.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, embodiments of the disclosure enable, at least, the quarantine of content items 208 or other data received while a computing device 102 or display 108 is locked. The quarantine enables a user 104 to review the content items 208 after unlocking the computing device 102 and before the content items 208 are stored elsewhere such as in a cloud service or synchronized with data stored remotely from the computing device 102. The review enables the user 104, for example, to detect tampering or to detect a phishing attack. Additionally, limited functionality of the computing device 102 is available while the display 108 is locked to enable the data capture. Such limited functionality improves the user experience by allowing the user 104 to perform an action quickly without first unlocking the display 108. For example, the user 104 quickly takes a snapshot of a scene in a single click without having to fumble with a code to unlock a mobile telephone. In another example, the user 104 views limited information about notifications received while the computing device 102 is locked.

Figure 1:
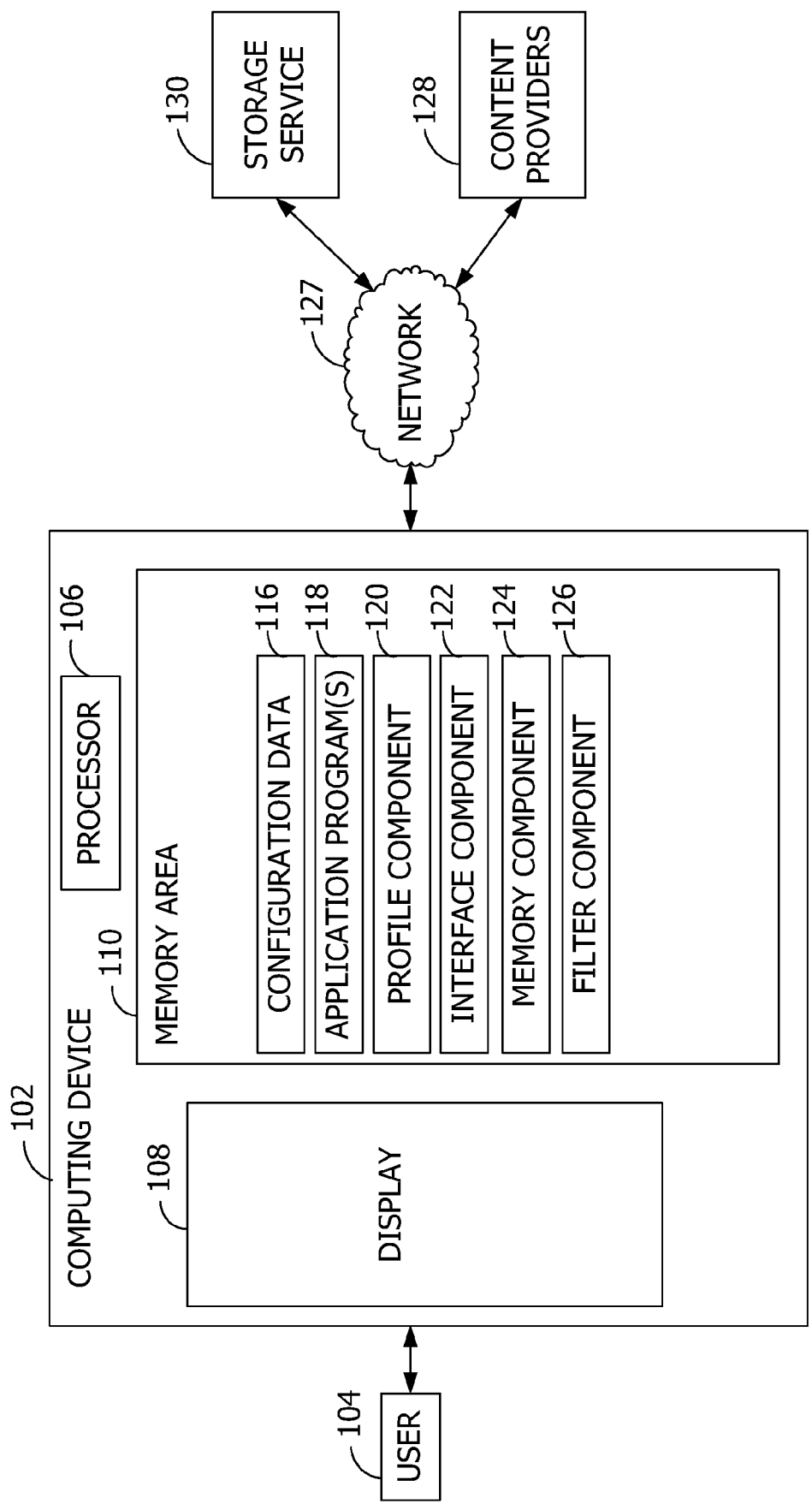
FIG. 1 is an exemplary block diagram illustrating a computing device delivering content from content providers to a user.

Referring again to FIG. 1, an exemplary block diagram illustrates the computing device 102 storing content received from content providers 128 and received from the user 104. The computing device 102 receives the content from the content providers 128 and/or from the user 104 while the display 108 of the computing device 102 is locked. Either manually or automatically (e.g., based on transfer criteria 210), the computing device 102 subsequently transmits or synchronizes the received content to a local memory area or a remote memory area such as that provided by a storage service 130 when the computing device 102 becomes unlocked. The storage service 130 represents, for example, a cloud service, or federated service making the content available to any computing device of the user 104 (e.g., laptop, mobile telephone, etc.).

The computing device 102 includes at least a memory area 110, the display 108, and a processor 106. The memory area 110, or other computer-readable media, stores configuration data 116. The configuration data 116 describes the content items 208 to present to the user 104 (e.g., received from the content providers 128) and/or functionality to provide to the user 104 when the computing device 102 is locked. The configuration data 116 includes, for example, a file or metadata describing a characteristic, type, category, classification, or other descriptor of the content items 208 that are to be presented to the user 104 through the display 108 of the computing device 102 when locked. The configuration data 116 may also identify particular application programs 118 or functions (e.g., within the application programs 118) that are available for execution by the user 104 through the display 108 of the locked computing device 102. Representations of the application programs 118 are displayed in, for example, a toolbar visible to the user 104 through the locked display 108. The representations include, for example, text or images (e.g., icons) corresponding to the application programs 118.

In some embodiments, the application programs 118, when executed, capture data from the user 104 or from the content providers 128 when the display 108 is locked. In general, the functionality available through the display 108 of the locked computing device 102 is a subset of the functionality available to the user 104 after the computing device 102 has been unlocked. The functionality enables the user 104 to enter data into the computing device 102 while the computing device 102 is locked, for later review and transfer to the storage service 130. For example, the functionality enables the user 104 to take a picture or video with a camera associated with the computing device 102, record a voice memo, enter a telephone number into the computing device 102, add a new contact for an address book, create an appointment or task, draw a sketch, store a song or map, or store geo-planted metadata.

The configuration data 116 may be stored in one or more data structures of any form. The configuration data 116 may be plain text, encrypted, binary, or any other form. Additionally, the configuration data 116 may be organized into a hierarchy, with some criteria applying to one or more of the content items 208, or to one or more of the application programs 118 available to the computing device 102.

The configuration data 116 may be defined by the user 104. In such embodiments, the user 104 identifies the particular functionality desired to be available through the display 108 of the locked computing device 102. For example, the user 104 may drag-and-drop applications into a particular region of the display 108 to select those applications to be available when the computing device 102 is locked. The selected applications may act as a toolbar on the display 108 of the locked computing device 102.

The configuration data 116 may also be defined by application developers. In such embodiments, the application developer of each application identifies the functionality that remains available to the user 104 when the computing device 102 becomes locked. The configuration data 116 in this example accompanies the installation or downloading of the application to the computing device 102. The identified functionality may represent a default setting, and may be overridden by the user 104 in some embodiments.

The display 108 includes any component for providing information to the user 104. For example, the display 108 includes any capacitive display capable of sensing touch input from the user 104 or another object such as a stylus. While aspects of the invention are described with reference to the display 108 being a touch sensitive or touch screen display, embodiments of the invention are operable with any display. For example, aspects of the invention are operable with non-touch sensitive displays such as found on devices that have a full or partial keyboard available for data entry. In such examples, the computing device 102 locks by disabling the keyboard from being used as a user input selection device for the computing device 102.

The processor 106 includes any quantity of processing units, and is programmed to execute computer-executable instructions for implementing aspects of the disclosure. The instructions may be performed by the processor 106 or by multiple processors executing within the computing device 102, or performed by a processor external to the computing device 102 (e.g., by a cloud service). In some embodiments, the processor 106 is programmed to execute instructions such as those illustrated in the figures (e.g., FIG. 3).

While aspects of the invention are described with reference to the computing device 102 being a mobile computing device 202 such as a mobile telephone, embodiments of the invention are operable with any computing device. For example, aspects of the invention are operable with devices such as digital cameras, digital video cameras, netbooks, laptop computers, gaming consoles (including handheld gaming consoles), portable music players, a personal digital assistant, an information appliance, and a personal communicator.

In general, the memory area 110 is associated with the computing device 102. For example, in FIG. 1, the memory area 110 is within the computing device 102. However, the memory area 110 or any of the data stored thereon may be associated with any server or other computer, local or remote from the computing device 102 (e.g., accessible via a network 127). In some embodiments, the memory 110 is considered to be a first memory area 204 or a second memory area 206 such as described with reference to FIG. 2 below. The memory area 110, or one or more computer-readable media, further stores computer-executable components for implementing aspects of the disclosure. Exemplary components include a profile component 120, an interface component 122, a memory component 124, and a filter component 126. These components are described below with reference to FIG. 2.

Figure 2:
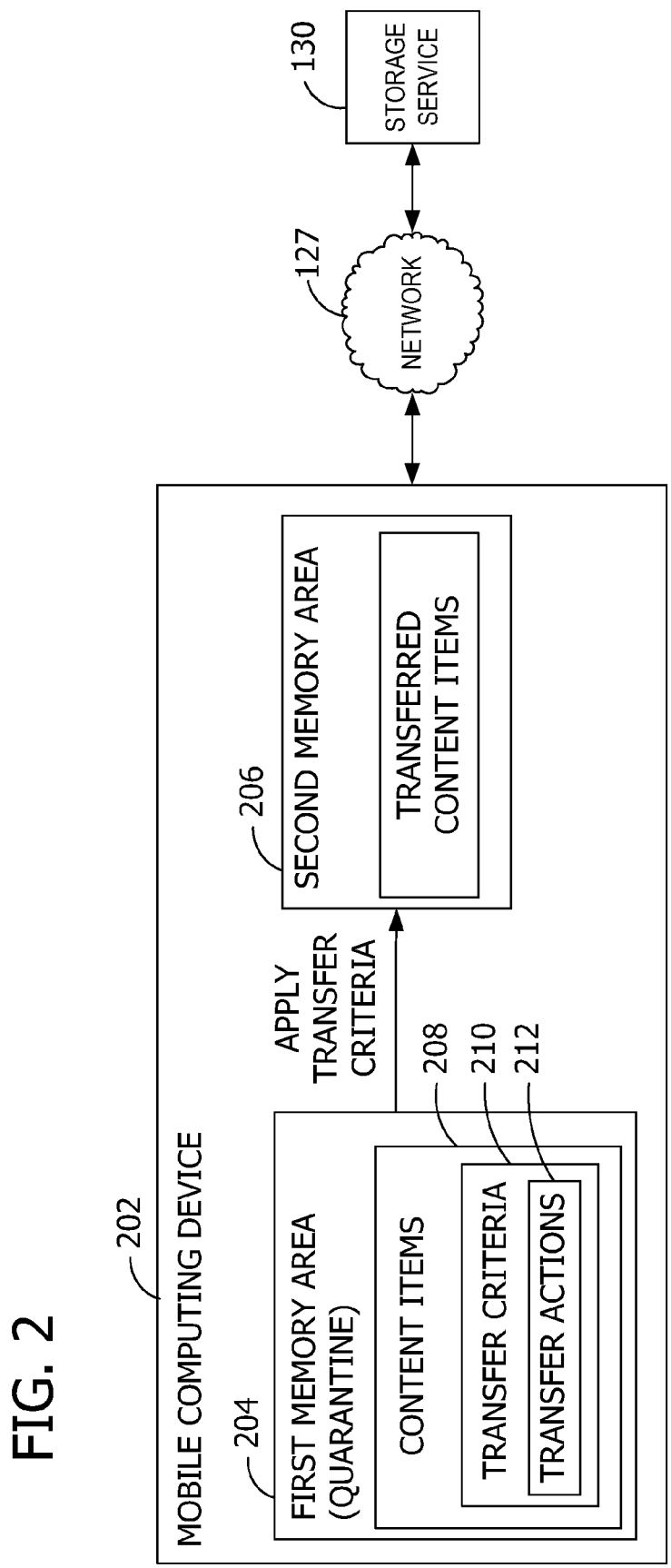
FIG. 2 is an exemplary block diagram illustrating a mobile computing device transferring content items out of quarantine based on transfer criteria.

Referring next to FIG. 2, an exemplary block diagram illustrates the mobile computing device 202 transferring content items 208 out of quarantine based on the transfer criteria 210. The content items 208 are received while a display of the mobile computing device 202 such as display 108 is locked. As described above, the content items 208 are provided by the user 104 or by one or more of the content providers 128. The received content items 208 are stored in the first memory area 204. The first memory area 204 is quarantined from the second memory, or is otherwise separate or distinct from the second memory area 206. For example, the first memory area 204 and the second memory area 206 are partitions of the same hard drive. In another example, the first memory area 204 and the second memory area 206 are separate hard drives accessible by the mobile computing device 202. In another example, the first memory area 204 is a hard drive inside the mobile computing device 202 while the second memory area 206 is the storage service 130 remote from the mobile computing device 202.

The transfer criteria 210 are associated with the received content items 208. The transfer criteria 210 identify one or more transfer actions 212 (e.g., a sequence of actions) or other instructions for managing the associated content items 208. For example, the transfer criteria 210 may specify automatic deletion of the content items 208 from the first memory area 204 after a predefined time period, or the automatic transfer of one or more of the content items 208 from the first memory area 204 to the second memory area 206. The automatic transfer occurs without confirmation from the user 104 at the time of transfer in these embodiments. In some embodiments, other instructions associated with the transfer criteria 210 are contemplated, such as prompting the user 104 for manual confirmation before implementing one or more of the transfer actions 212.

The transfer criteria 210 are applied when the mobile computing device 202 (or its display) is subsequently unlocked (e.g., by the user 104). At the time of unlocking, the mobile computing device 202 applies the transfer criteria 210 to process the content items 208 stored in the first memory area 204. For some of the content items 208 (e.g., depending on the transfer criteria 210 for those content items 208), the user 104 is involved in the process such as being prompted for confirmation of the transfer actions 212. For other content items 208, the transfer criteria 210 are applied automatically and the content items 208 are processed without input from the user 104.

The transfer criteria 210 may be received from the user 104, from the content providers 128, or from other entities. In some embodiments, if the user 104 provides the content items 208, the user 104 may also provide instructions as the transfer criteria 210 for processing the content items 208. For example, the user 104 records a voice memo while the mobile computing device 202 is locked, then inputs instructions (e.g., the transfer criteria 210) for storing the voice memo in a particular file directory on the mobile computing device 202 (e.g., the second memory area 206) after the mobile computing device 202 has been unlocked. Alternatively, the user 104 directs the voice memo to be stored in the second memory area 206 even while the mobile computing device 202 is locked, thereby bypassing the first memory area 204 entirely. In another example, the user 104 captures an image with a camera on the mobile computing device 202, then inputs instructions for uploading the captured image to a web page such as a blog or image-sharing web site after the mobile computing device 202 is unlocked. In such an example, the web page may be stored in the second memory area 206 or in the storage service 130. In yet another example, the user 104 enters or otherwise captures a product identifier (e.g., bar code image, SKU number, model number, etc.) as one of the content items 208 while the mobile computing device 202 is locked. The user 104 identifies, as part of the transfer criteria 210, merchant or store names. When the mobile computing device 202 unlocks, the filter component 126 accesses web pages from an online store for the merchant and provides details about the product identified by the product identifier. The details include, for example, specifications and price. In this manner, while shopping at a local retailer, the user 104 is able to set reminders to research particular products. Upon later unlocking the mobile computing device 202, the user 104 is automatically presented with details for the products.

In embodiments in which the content providers 128 provide the content items 208, the content providers 128 may also provide at least a portion of the transfer criteria 210. For example, one of the content providers 128 provides a new electronic mail message to the mobile computing device 202. The content provider 128 then provides instructions (e.g., the transfer criteria 210) to perform the following actions while the mobile computing device 202 is locked: store the electronic mail message in the first memory area 204, display a portion of the electronic mail message to the user 104 (e.g., the From or Subject fields), and prompt the user 104 to read, save, or delete the message. Based on the response from the user 104, the mobile computing device 202 performs the read, save, or delete operations. After the mobile computing device 202 unlocks, the content items 208 that were not deleted are transferred to the second memory area 206 or to the storage service 130 based on the transfer criteria 210.

In some embodiments, default transfer criteria are associated with each of the content items 208 based on a type of the content items 208. For example, there are different default transfer criteria for images, text messages, voice mails, voice memos, etc. In a particular example, the default transfer criteria specify that images taken by a camera associated with the mobile computing device 202 are to be uploaded to a web site (e.g., stored by the second memory area 206 or by the storage service 130) upon unlocking of the mobile device. In another example, a timestamp or location information is automatically determined and stored with the content items 208 at the time of capture of the content items 208. The timestamp, location information, or other metadata may be evaluated as part of the transfer criteria 210 when the mobile computing device 202 is unlocked to determine how to process the associated content items 208. For example, images taken in a particular geographic region are automatically uploaded to a blog, while images taken in another geographic region are saved to a personal images directory when the computing device is unlocked.

In some embodiments, one or more computer-executable components execute on the mobile computing device 202 to apply the transfer criteria 210 to process the content items 208 stored in the first memory area 204. The profile component 120 accesses the configuration data 116 identifying the application programs 118 available for execution on the mobile computing device 202 while the mobile computing device 202 is locked (e.g., in a first state). The mobile computing device 202 executes the identified application programs. The interface component 122 receives, via the executing application programs, one or more of the content items 208 while the mobile computing device 202 is locked. The memory component 124 stores the content items 208 received by the interface component 122 in the first memory area 204. The filter component 126 receives a command (e.g., from the user 104 or from another entity) to transition the mobile computing device 202 from locked to unlocked (e.g., from the first state to the second state), and transitions the mobile computing device 202 responsive to the received command. For example, the user 104 may tap (e.g., double-tap, slide left, slide right, flick the icon, or perform another pre-defined input gesture) on one of the icons to unlock the mobile computing device 202 and be taken to the application program 118 corresponding to the selected icon. At this point, full interaction with the application program 118 is enabled. In such embodiments, the user 104 does not explicitly unlock the mobile computing device 202, but rather the unlock operation and the execution of the application program 118 occur responsive to the gesture or command from the user 104. In other embodiments, the user 104 is directed to an unlock screen (e.g., PIN input screen) responsive to the input gesture from the user 104 to receive the unlock PIN from the user 104 before allowing the user 104 to fully access the application program 118. After the mobile computing device 202 is unlocked, the filter component 126 evaluates the transfer criteria 210 associated with the received content items 208 to move one or more of the content items 208 from the first memory area 204 to the second memory area 206.

Figure 3:
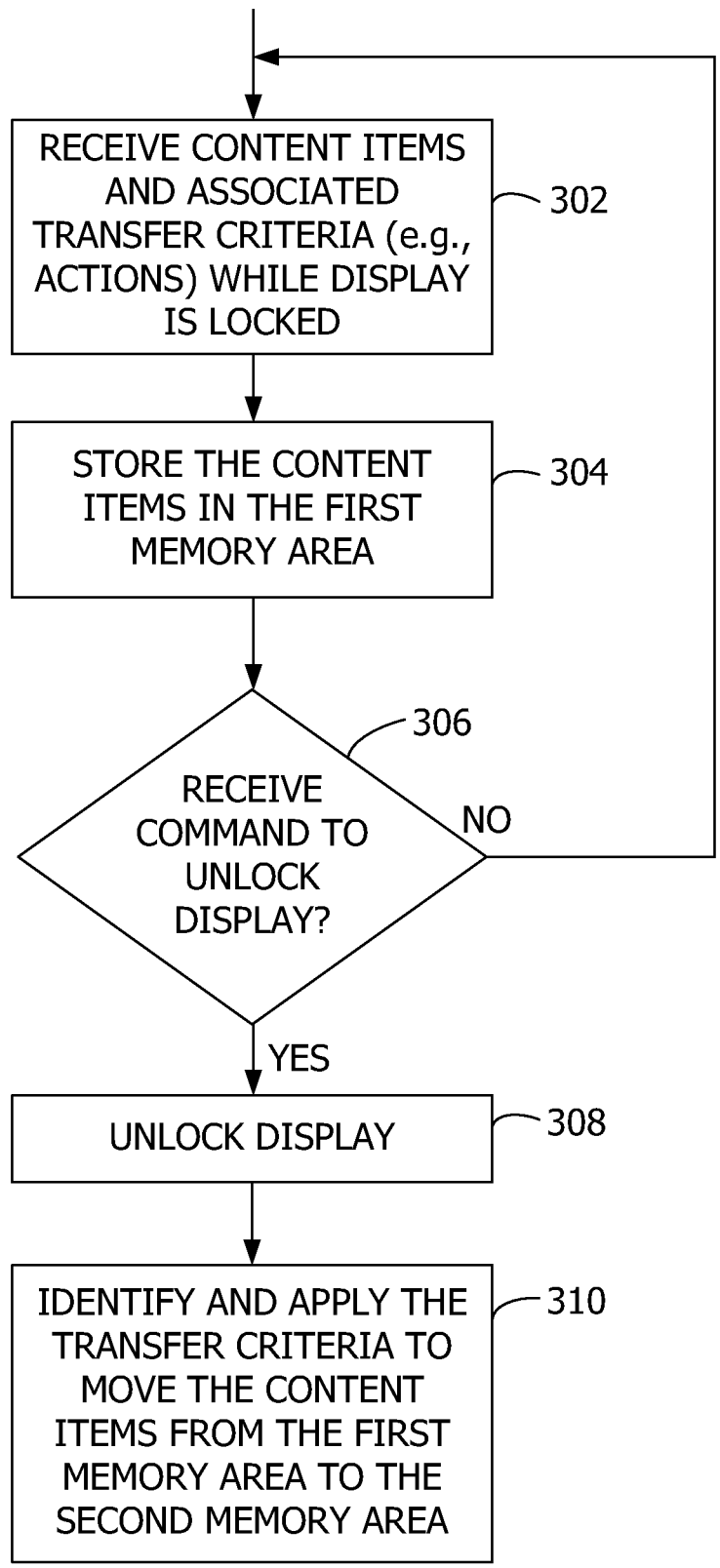
FIG. 3 is an exemplary flow chart illustrating the receipt, quarantine, and release of data by a computing device with a locked display.

Referring next to FIG. 3, an exemplary flow chart illustrates the receipt, quarantine, and release of data by the computing device 102 with a locked display such as display 108. At 302, the content items 208 and associated transfer criteria 210 are received while the display 108 is locked. The content items 208 and transfer criteria 210 are stored in the first memory area 204 at 304, which as described herein is quarantined from the second memory area 206. Upon receiving a command to unlock the display 108 at 306, the display 108 is unlocked at 308. Upon unlocking the display 108, the content items 208 are processed. The transfer criteria 210 associated with the content items 208 are identified and applied at 310 to move one or more of the content items 208 from the first memory area 204 to the second memory area 206.

Figure 4A:
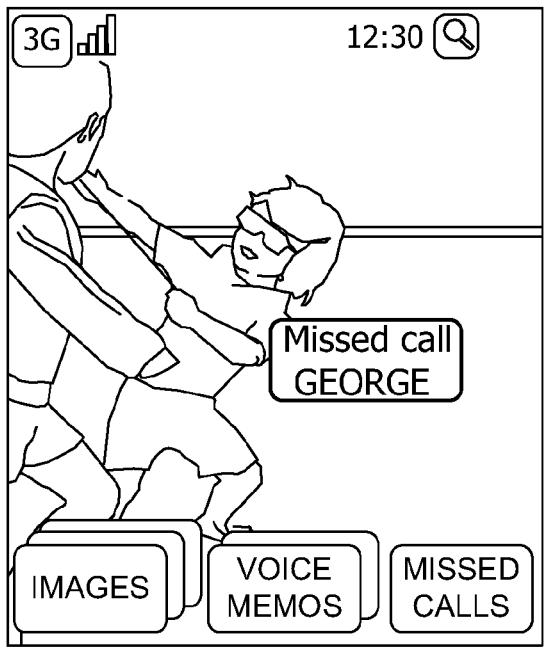
FIG. 4A through FIG. 4C are exemplary user interfaces illustrating the presentation of quarantined data on a locked display on a computing device and the subsequent execution of a related application program after unlocking the display.
Figure 4B:
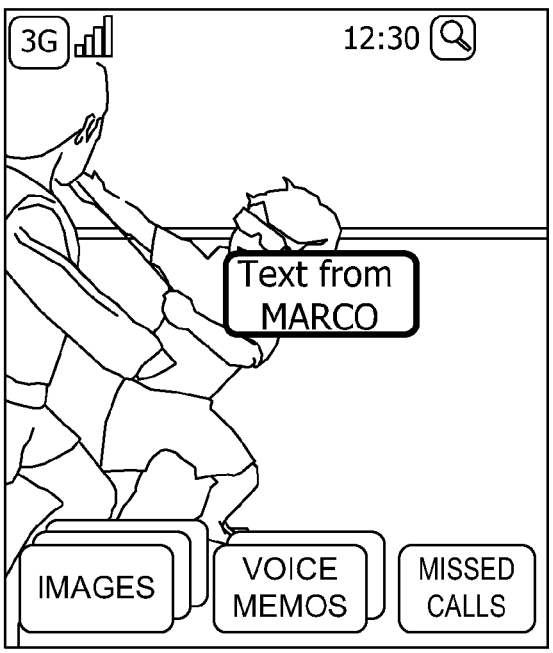
Figure 4C:
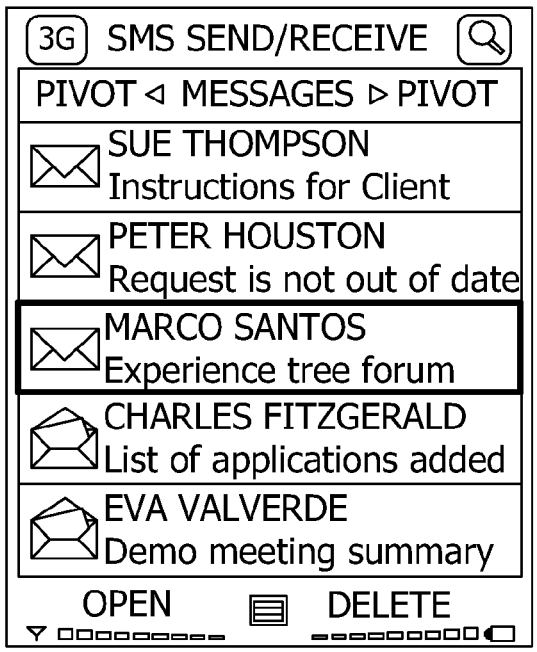

Referring next to FIG. 4A through FIG. 4C, exemplary user interfaces illustrate the presentation of quarantined data on a locked display such as display 108 on a computing device such as computing device 102 and the subsequent execution of a related application program in user interface after unlocking the display 108. In the exemplary user interfaces of FIG. 4A, FIG. 4B, and FIG. 4C, the computing device 102 includes a touch sensitive display. In the example of FIG. 4A and FIG. 4B, the display 108 is locked and icons are presented corresponding to the content items 208 received while the display 108 has been locked. The computing device 102 may be locked, for example, after an explicit command from the user 104 or after expiration of a predefined period of time (e.g., an inactivity timeout value).

The content items 208 include images, voice memos, and missed calls. The images have been captured by the user 104 via a camera associated with the computing device 102, received from the content providers 128, or received from another device such as via BLUETOOTH networking protocols. The voice memos have been recorded by the user 104 while the display 108 has been locked. As further shown in the user interface, a notification of a missed call from George is displayed. The content items 208 are stored in a quarantined memory area (e.g., the first memory area 204) associated with the computing device 102.

In FIG. 4B, the display 108 remains locked, and another content item 208 is received. The content item 208 in this example is a notification of a text message from Marco. Continuing the example, the user 104 wants more information about the text message before determining whether to delete the text message or view the contents of the text message. While the display 108 is still locked, the user 104 selects the notification by, for example, flicking the notification, dragging the notification off the display 108, or otherwise selecting the notification. Responsive to the selection, the application program 118 associated with the notification executes to provide the limited functionality specified by the configuration data 116 to the user 104. In the example of FIG. 4C, the application program 118 executes a short message service (SMS) send/receive application program to display the sender and subject of the notification. The user 104 then inputs the transfer criteria 210 for the notification by marking the notification for deletion, marking the notification to be preserved for future viewing in detail, or selecting the notification for immediate viewing. If the user 104 selects the notification for immediate viewing, the display 108 is unlocked and the SMS send/receive application program executes to display more information about the text message. The display 108 is unlocked without a code or other extra step for unlocking the device.

Alternatively, the user 104 wants to read the entire text message associated with the notification and instead sends a command to the computing device 102 to unlock the display 108 and execute the SMS send/receive application program. In this instance, the SMS send/receive application program executes to display the text messages to the user 104 after the display 108 is unlocked. The limited functionality available through the locked display 108 is not executed in this example.

In some embodiments, the icons or other representations of the content items 208 have slider functionality. In the touch sensitive display embodiment, the user 104 touches one of the icons, and drags the icon to the left or right (or up or down) to perform an operation (e.g., reveal additional information, as specified by the configuration data 116).

Exemplary Operating Environment

By way of example and not limitation, computer readable media comprise computer storage media and communication media. Computer storage media store information such as computer readable instructions, data structures, program modules or other data. Communication media typically embody computer readable instructions, data structures, program modules, or other data in a modulated data signal such as a carrier wave or other transport mechanism and include any information delivery media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for quarantining received data while the display 108 of the mobile computing device 202 is locked, and exemplary means for enabling the user 104 to review the content items 208 before transfer from the first memory area 204 to the second memory area 206.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for quarantining data received while a display of a mobile computing device is locked, said system comprising:
   a first memory area for storing a plurality of content items captured from a user of a mobile computing device by the mobile computing device while a display of the mobile computing device is locked;
   a second memory area, separate from the first memory area, for storing one or more of the plurality of content items from the first memory area; and
   a processor programmed to:
   determine transfer actions for each of the content items stored in the first memory area;
   receive a command to unlock the display;
   unlock the display responsive to the received command;
   responsive to unlocking the display and without input from the user, applying the determined transfer actions to the plurality of content items from the first memory area to transfer said one or more of the plurality of content items from the first memory area to the second memory area.

2. The system of claim 1, wherein the first memory area further stores configuration data describing functionality available to the user when the display is locked.

3. The system of claim 2, wherein the configuration data identifies an application program available for execution while the display is locked, and wherein the application program, when executed, captures and stores one or more of the content items in the first memory area.

4. The system of claim 3, wherein the configuration data defines a subset of functionality of the application program.

5. The system of claim 1, wherein the content items relate to one or more of the following: an electronic mail message, a voice mail message, a text message, and an image taken by a camera associated with the mobile computing device.

6. The system of claim 1, further comprising means for enabling the user to review the content items before transfer from the first memory area to the second memory area.

7. A method comprising:
   receiving, by a computing device, one or more content items from a user of the computing device while a display of the computing device is locked;
   defining transfer criteria for each of the received content items;
   storing the received content items in a first memory area of the computing device;
   receiving a command to unlock the display;
   unlocking the display responsive to the received command; and
   transferring, based on the defined transfer criteria and responsive to said unlocking and without input from the user, one or more of the content items from the first memory area to a second memory area of the computing device, wherein the first memory area is quarantined from the second memory area.

8. The method of claim 7, further comprising defining configuration data describing functionality available to the user of the computing device when the display is locked.

9. The method of claim 8, wherein defining the configuration data comprises identifying an application program for execution while the display is locked.

10. The method of claim 7, wherein the transferred content items are associated with one or more application programs, and further comprising executing the application programs after said unlocking.

11. The method of claim 7, further comprising providing, through the locked display, representations of one or more application programs available on the computing device while the display is locked, wherein the representations are provided as a toolbar.

12. One or more computer storage media having computer-executable components, said components comprising:
   a profile component that when executed by at least one processor causes the at least one processor to access configuration data identifying one or more application programs available for execution on a computing device while the computing device is in a first state;
   an interface component that when executed by at least one processor causes the at least one processor to receive one or more content items from a user of the computing device while the computing device is in the first state, said interface component receiving the content items via the application programs;
   a memory component that when executed by at least one processor causes the at least one processor to store the content items received by the interface component in a first memory area; and
   a filter component that when executed by at least one processor causes the at least one processor to evaluate transfer criteria, responsive to transition of the computing device to a second state and without input from the user, to move one or more of the content items from the first memory area to a second memory area, said second memory area being separate from the first memory area.

13. The computer storage media of claim 12, wherein the filter component receives a command to transition the computing device to the second state, and transitions the computing device to the second state responsive to the received command.

14. The computer storage media of claim 12, wherein at least one of the content items includes a product identifier, wherein one or more of the transfer criteria identify an online merchant, and wherein the filter component obtains and provides a web page associated with the online merchant to the user of the computing device.

15. The computer storage media of claim 12, wherein the first state corresponds to a locked state of the computing device, and wherein the second state corresponds to an unlocked state of the computing device.

* * * * *